United States Patent [19]

Choi et al.

[11] Patent Number: 5,098,936

[45] Date of Patent: Mar. 24, 1992

[54] IMPACT RESISTANT POLYURETHANE FOAM AND A METHOD FOR MANUFACTURING THEREOF

[75] Inventors: Jin S. Choi; Jae M. Lee; Hyeong S. Kim, all of Pusan, Rep. of Korea

[73] Assignee: Dong Sung Chemical Ind. Co., Ltd., Pusan, Rep. of Korea

[21] Appl. No.: 592,486

[22] Filed: Oct. 1, 1990

[30] Foreign Application Priority Data

Sep. 29, 1989 [KR] Rep. of Korea ............... 89-14040
Feb. 23, 1990 [KR] Rep. of Korea ............... 90-2337

[51] Int. Cl.$^5$ .............................................. C08G 18/14
[52] U.S. Cl. ...................................... 521/112; 521/174
[58] Field of Search ............................... 521/112, 174

[56] References Cited

U.S. PATENT DOCUMENTS 4,195,151 3/1980 Dunleavy et al. ................ 528/163

FOREIGN PATENT DOCUMENTS 63-79217 4/1987 Japan .

*Primary Examiner*—Maurice J. Welsh
*Attorney, Agent, or Firm*—Cushman, Darby & Cushman

[57] ABSTRACT

This invention relates to an impact resistant material composed of polyether-based micro-cellular polyurethane foam:more particularly, however, this invention relates to the impact resistant polyurethane foam having a new physical property, and a methods of foamed polyurethane as set forth hereunder, demonstrating a remarkable impact resistance effect and recovery force as well and furthermore, making it possible to control the specific gravity of molding in manufacture:mixing the prepolymer containing residual isocyanate or isocyanate monomer with resin consisting of ether-type polyol, plasticizer, and organic siloxane and casting this mixture for the preparation of foamed molding.

4 Claims, No Drawings

5,098,936

IMPACT RESISTANT POLYURETHANE FOAM AND A METHOD FOR MANUFACTURING THEREOF

TECHNICAL FIELD OF INVENTION

This invention relates to an impact resistant material composed of polyether-based micro-cellular polyurethane foam: more particularly, however, this invention relates to the impact resistant polyurethane foam having a new physical property, and a methods of foamed polyurethane as set forth hereunder, demonstrating a remarkable impact resistance effect and recovery force as well and furthermore, making it possible to control the specific gravity of molding in manufacture: mixing the prepolymer containing residual isocyanate or isocyanate monomer with resin consisting of ether-type polyol, plasticizer, and organic siloxane and casting this mixture for the preparation of foamed molding.

BACKGROUND OF THE INVENTION

Among the existing impact resistant materials used hitherto, the polyurethane urea elastomer, first of all, has been widely used in various forms of molding on an industrial scale, but the elastomer in its actual application has suffered from disadvantages such as a high cost in manufacture, high specific gravity, and disproportionate relations among physical property, impact resistant effect, and recovery force.

Secondly, the microcellular foamed impact resistant material has also a recognized disadvantage in that, to decrease the change of impact resistant effect owing to the variation of outer temperature, the amine-substituted polyol which is made through the specifically complicated polymerization reaction, and aromatic vinyl monomer requiring high costs have been inevitably used. Further, in order to supplement the impact resistant effect, various kinds of fillers including asphalts and adhesives have been separately added in large amounts.

Under such disadvantages, the usual impact resistant foam led to increases in their specific gravities and costs. So, their practical usage has been reduced, and in the related fields, their application scope is quite limited.

SUMMARY OF THE INVENTION

Hence, unlike the usual impact resistant foam using the specifically manufactured amine-substituted polyol and various kinds of aromatic vinyl-type monomer, the present invention is based upon the fact that, although the use of simple propyleneoxide-polymerized polyol having divalent to quadrivalent hydroxyl functional groups, by the selection of reaction accelerator and surfactant, it is possible to change the foamed structure to obtain a remarkable impact-resistant effect and recovery force.

Therefore, it is an object of this invention, by correcting some disadvantages from which the usual impact resistant foams have suffered, to provide a new type of impact resistant foam whose physical properties are remarkably improved, through the preparation of foamed molding made by mixing and casting two kinds of components, for instance 1) prepolymer containing residual isocyanate or isocyanate, 2) resin manufactured from ether-type polyol, plasticizer, organic siloxane, etc.

DETAILED DESCRIPTION OF PREFERRED EMBODIMENTS OF THE INVENTION

The present invention provides an impact resistant polyurethane foam whose elasticity is less than 10% and whose permanent compression set is less than 5%. And this is made from the following composition.

1) diisocyanate monomer or prepolymer manufactured from a reaction between a diisocyanate and a propyleneoxide-based polydiol having a hydroxyl number of from 30 to 500 mg KOH/g, and having a residual isocyanate contents of 5~25 wt %.

2) resin composed of a propyleneoxide-based poly(-diol) whose hydroxyl number is 25~100 mg KOH/g, a propyleneoxide-based poly(triol) whose hydroxyl number is 20~1000 mg KOH/g, a propylene oxide-based poly(tetraol) whose hydroxyl number is 50~220 mg KOH/g, a diamine-based and organic metal-based reaction accelerator, a plasticizer and polyalkyl- or polyalkoxy siloxane, and having a moisture content of 0.3~3.0 wt %.

The impact resistant foam according to this invention has an irregular interpenetrating network structure.

This invention is described in more detail below based upon the preferred manufacturing methods.

The impact-resistant foam of the present invention can be made by either of two different methods as follows:

The First Method (Hereinafter Referred to as "Prepolymer Method")

In line with the manufacture of foamed, impact-resistant material in micro-cell phase, composed of polyether-polymerized polyurethane, A) Manufacturing prepolymer through a two step addition polymerization reaction, from diisocyanate monomer and a propyleneoxide-based polydiol(hydroxyl value of from 30~500 mg KOH/g);

B) Mixing and agitating a polydiol having two hydroxyl functional groups at a chain end, and a hydroxyl value of from 25 to 100 mg KOH/g, a polyol of a propyleneoxide series, having three hydroxyl functional groups at a chain end, and a hydroxyl value of from 20 to 1,000 mg KOH/g, a propyleneoxide-based polyol, having four hydroxyl functional groups at a chain end, and a hydroxyl value of from 50 to 220 mg KOH/g, a plasticizer, an organic siloxane, and additives including a reaction accelerator, to manufacture the resin;

C) Pre-heating the above two components A) and B) at approx. 40° to 60° C., and mixing the components, and rapid-agitating the resulting mixture to manufacture the foamed molding by casting.

If necessary, the mold is preheated to a temperature of 50°~70° C. and treated in advanced with a releasing agent. The mold index may be available from 1.0 to 2.0 according to its use. After casting, the mixture is retained in the mold for about five to ten minutes, and demolded. Then, have the product is post-cured in the air for about 24 hours, and thus, the impact resistant foam in an optimum state may be obtained.

Under the manufacture by the Prepolymer Method, the above two step addition polymerization reaction is conducted in the presence of dry inert gas, at a temperature of approx. 50° to 120° C. At this moment, considering the mixing ratio between the prepolymer and resin, and also, considering the presence ratio between soft segment and hard segment and viscosity, deciding the amount of isocyanate monomer and the polyol in polymerization, and reducing pressure, and evaporating the gas, and manufacturing the prepolymer so that the residual isocyanate content may be in the range of from 5% to 20% by weight, are steps which are practiced.

Also, in the case of manufacturing the above B(resin), mixing polyol with diol monomer and some additives (e.g., diamines which are reaction accelerators, organic metallic reaction accelerators, etc.), and manufacturing the resin so that the final water content may be in the range of from 0.3 to 3.0 by weight are steps which are practiced.

Here, for the dispersion effect and the speed modulation of interpenetrating-network formation reaction, the following diamines and organic metal compounds are used by rapidly agitating and dispersing them into a diol monomer or a propyleneoxide-based polydiol having a hydroxyl value of from 45 to 800 mg KOH/g: diamines(tetramethylethylenediamine, tetramethylhexadiamine, tetraethylmethylenediamine, diethylpiperazine, or triethylenediamine) and organic metallic compounds (stannousoctoate, dibuthylenediacetate, sodium bicarbonate, leadoctate, or potassium acetate).

Some aromatic diisocyanates[e.g., toluene diisocyanate, xylene diisocyante, 3,3'-dimethyldiphenyl-4,4'-diisocyanate, paraphenylenediisocyanate, or 4,4'-methylene-bis(phenylisocyanate)], may be used as diisocyanate momoner. Further, some plasticizers(e.g., dimethylphthalate, diethylphthalate, diisobutylphthalate, dibutylphthalate, dioctylphthalate, dinonylphthalate, diisooctylphthalate, diisodecylphthalate, dipropyleneglycolbenzoate, tricresylphosphate, octyldiphenylphosphate, or cresyldiphenylphosphate) may be usd.

Also, some derivatives from polymethylsiloxane and polyoxyethylene syloxane may be used as organic siloxanes.

The Second Method(Hereinafter Referred to as the "One Shot Method")

In the manufacture of the impact resistant microcellular-foam composed of polyether-based polyurethane, A) Pre-heating diisocyanate monomer to a temperature of approximately 20° to 60° C.;

B) Mixing a propyleneoxide-based polyol having two to four hydroxyl functional groups or activated hydrogen atoms with some additives such as a plasticizer (of the type disclosed above), and agitating rapidly to manufacture the resin;

C) Agitating rapidly the A(isocyanate) and B(resin) preheated to approximately 40° to 60° C., and manufacturing the foamed moldings.

In the case of the One Shot Method, its general manufacturing process is the same as that of the Prepolymer Method. However, in the manufacturing process of the B(resin), it is desirable to use the higher molecular weight(two times or three times) of polyol than in the Prepolymer Method so as to avoid maldistribution of the hard segment.

The impact resistant material of this invention is based upon the manufacture as explained above: following the first reaction of primary hydroxy, water, and isocyanate functional group, a complex of urethane and urea is formed and by the reaction heat at this moment, an irregular network structure is formed from the second interpenetrating network formation such as the complex of biuret and allophanate. The reaction between water and isocyanate leads to the occurence of $CO_2$ gas, which is evenly dispersed by organic siloxane.

Thus, there remains a nearly same presence ratio between closed cell and continued cell.

When impact is given from the outside, therefore, a first cushioning action is made by closed cells and continued cells and the impact energy is absorbed by the segment within the irregular network structure.

In the meantime, when any material is strained by impact, its recovery is available by the elasticity of two functional polyols and by the maldistribution of closed cells. On the other side, an aromatic plasticizer has a role of preventing excessive elasticity, so the plasticizer comes to control the balance adequately between impact resistance and strain recovery.

The impact resistant material according to this invention has the following advantages compared with existing materials.

1) Since this invention does not use amine-substituted polyol which has undergone a complicated process, and fillers such as aromatic monomer, the manufacture cost is very reasonable.

2) The product of this invention can have a variety of specific gravities, and its applicable scope is very wide.

3) While an existing foamed impact resistant material has the effect less than 85%, the foamed impact resistance material according to this invention has an effect of more than 92%, as determined using the KSM testing method, and about 8% elasticity. Especially, under temperature which is below zero, hardness is more or less increasing but, the impact resistance force is on a rapid increase, thereby showing about 2% in elasticity.

4) According to the KSM-6518 test, the permanent compression set of the existing impact resistant foam is more than 10% at room temperature, while the permanent compression set in this invention is about 2%, in spite of the polyurethane being the same ether-type.

5) In the foaming process, this invention can use the foaming equipment of existing urethane foam manufacturing processes, without additional facilities; for example, the foaming process can be easily conducted by such methods as molding, slave, spray, and RIM.

6) A further advantage in the foamed structure is linked with superior adhesion and thus, there is no difficulty adhering to the applicable part.

As described above, the impact resistant foam according to this invention has several advantages, so that it can be used in the manufacture of structures requiring impact resistance, such as automobile streetcars, factory facilities, the interiors of houses, office automation equipment, as well as in rebound proof/sound proof fields. Further, it can be favourably used in the field of various sports items such as mats, gloves, boards, and protectors as a wider application.

The invention is illustrated by the following Examples, but this invention is not confined to the Examples.

EXAMPLE 1:

A molded impact-resistant polyurethane foam product was prepared as follows:

Reacting poly(propylene oxide) having a hydroxyl value of 30, with 4,4'-methylene-bis(phenylisocyanate), at a temperature of 100° C., while adding dried inert gas, and thus, manufacturing a prepolymer containing residual isocyanate of 19% by weight.

Further, mixing a polyol such as poly(propylene oxide), poly(glycerin/propylene oxide), and poly(pentaerythritol/propyleneoxide) having a hydroxy value of 56, each based upon the equivalence ratio of 3:2:4, respectively; as additives, adding 3 pbw of a reaction accelerator which is a known tertiary amine dispersed into 1,6-hexamethylene, 6 pbw of a reaction accelerator which is a known organic metal rapidly agitated and dispersed into poly(propylene oxide), and 3 pbw of a polyethylene siloxane, respectively, in proportion to 100 pbw polyol; as plasticizers, adding 20 pbw tricresylphosphate (TCP) in proportion to 100 pbw polyol as aforementioned; at an increased temperature of up to 80° C., agitating and mixing the compound for 1.5 hours to manufacture a resin whose water content is in the range of 1.0±0.01 by weight. Then, the prepolymer and resin are preheated at the temperature of 50° C. and molding is processed in accordance with the aforementioned method. The resulting physical properties of molding's specimen is shown in Table 1.

TABLE 1

| (Physical properties of specimen having 10 mm in thickness) | | | | | |
|---|---|---|---|---|---|
| Equivalent ratio between isocyanate and hydroxy | 1.30 | 1.25 | 1.20 | 1.15 | 1.10 |
| Specific gravity of molding (g/cc) | 0.40 | 0.40 | 0.40 | 0.40 | 0.40 |
| Hardness (Shore C) | 37 | 36 | 35 | 33 | 30 |
| Rebound (%) | 6 | 6 | 7 | 7 | 8 |
| Tensile strength (kg/cm$^2$) | 11 | 10 | 10 | 9 | 8 |
| Elongation (%) | 220 | 220 | 220 | 220 | 220 |
| Tear strength (kg/cm) | 4.5 | 4.4 | 4.3 | 4.3 | 3.1 |
| Compression set (%) | | | About 2 | | |

Where, 1) Mold temperature is 60° C., 2) Cream time/rising time/tack free time/demolding time is 7 sec./90 sec./60 sec./7 min. respectively, 3) Free-blown specific gravity is 0.15 g/cc. 4) The testing conditions of physical property are based upon KSM-6518 testing method of the Korean Industrial Standard at an atmospheric temperature of 20° C.

EXAMPLE 2:

A molded impact-resistant polyurethane foam product was prepared as follows:

Reacting poly(propyleneoxide) having a hydroxyl value of 50, with 4,4'-methylene-bis(phenylisocyanate) at the temperature of 100° C. while adding dry inert gas, and thus, manufacturing a prepolymer containing residual isocyanate of 15% by weight.

Further, mixing poly(propyleneoxide) having a hydroxyl value of 37, poly(glycerin/propyleneoxide) having a hydroxy value of 48, and poly(ethylenediamine/propyleneoxide) having a hydroxy value of 56 based upon the equivalent ratio of 2:1:2 respectively; as additives, adding 3 pbw of a reaction accelerator in which a known tertiary amine is dispersed into 1,6-hexamethylene, 5 pbw of a reaction accelerator in which a known organic metal is rapidly agitated and dispersed into poly(propyleneoxide) and 2 pbw of polyethylene siloxane respectively, in proportion to 100 pbw polyol; as plasticizers, adding 10 pbw of TCP in proportion to 100 pbw of polyol as aforementioned; at an increased temperature of up to 80° C., agitating and mixing the compound for 1.5 hours to manufacture the resin whose water content is in the range of 1.50±0.01 by weight.

Other processing is conducted in a same manner as in EXAMPLE 1. As a result, the physical property of molding's specimen is shown in Table 2.

TABLE 2

| (Physical properties of specimen having 10 mm in thickness) | | | | | |
|---|---|---|---|---|---|
| Equivalent ratio between isocyanate and hydroxy | 1.40 | 1.35 | 1.30 | 1.25 | 1.20 |
| Specific gravity of molding (g/cc) | 0.38 | 0.38 | 0.38 | 0.38 | 0.38 |
| Hardness (Shore C) | 45 | 48 | 48 | 46 | 43 |
| Rebound (%) | 5 | 5 | 5 | 5 | 5 |
| Tensile strength (kg/cm$^2$) | 12.3 | 12.0 | 12.0 | 11.6 | 11.0 |
| Elongation (%) | 220 | 220 | 240 | 240 | 240 |
| Tear strength (kg/cm) | 6.8 | 6.1 | 5.8 | 4.8 | 3.7 |
| Compression set (%) | | | About 2 | | |

Where: 1) Mold temperature is 60° C., 2) Cream time/rising time/tack free time/demolding time are 6 sec./90 sec./50 sec./7 min. respectively, 3) Free-blown specific gravity is 0.15 g/cc, and 4) The testing conditions of physical property are based upon KSM-6518 testing method of the Korean Industrial Standard at an atmospheric temperature of 20° C.

EXAMPLE 3:

A molded impact-resistant polyurethane foam product was prepared as follows:

Reacting poly(propyleneoxide) having a hydroxyl value of 200 with 4,4'-methylene-bis(phenylisocyanate) at a temperature of 100° C. while adding dry inert gas, and thus, manufacturing a prepolymer containing residual isocyanate of 15% by weight.

Further, mixing poly(propyleneoxide) having a hydroxyl value of 28, poly(glycerin/propyleneoxide) having a hydroxy value of 56, and poly(pentaerythritol/propyleneoxide) having a hydroxy value of 110, based upon the equivalent ratio of 1:1.5:2 respectively; as additives adding 3 pbw of a reaction accelerator in which a known tertiary amine is dispersed into 1,6-hexamethylene, 6 pbw of a reaction accelerator in which a known organic metal is rapidly agitated and dispersed into poly(propyleneoxide), and 2 pbw of polyethylene siloxane respectively, in proportion to 100 pbw of polyol; as plasticizers, adding 30 pbw of dioctylphthalate(D.O.P.) in proportion to 100 pbw of polyol as aforementioned; at an increased temperature of up to 80° C., agitating and mixing the compound for 1.5 hours to manufacture a resin whose water content is in the range of 2.00±0.01 by weight.

Other processing is conducted in a same manner as in EXAMPLE 1. As a result, the physical property of molding's specimen is shown in Table 3.

TABLE 3

| (Physical properties of specimen having 10 mm in thickness) | | | | | |
|---|---|---|---|---|---|
| Equivalent ratio between isocyanate and hydroxy | 1.80 | 1.70 | 1.60 | 1.50 | 1.40 |
| Specific gravity of molding (g/cc) | 0.26 | 0.26 | 0.26 | 0.26 | 0.26 |
| Hardness (Shore C) | 36 | 33 | 26 | 48 | 46 |
| Rebound (%) | 6 | 6 | 6 | 6 | 6 |
| Tensile Strength (kg/cm$^2$) | 11 | 10 | 9 | 8 | 7 |
| Elongation (%) | 240 | 220 | 220 | 220 | 220 |
| Tear strength (kg/cm) | 4.2 | 4.0 | 3.4 | 3.0 | 2.0 |
| Compression set (%) | | | About 2 | | |

Where: 1) Mold temperature is 60° C., 2) Cream time/rising time/tack free time/demolding time are 6 sec./100 sec./70 sec./7 min. respectively, 3) Free-blown specific gravity is 0.086 g/cc, 4) The testing conditions of physical property are based upon KSM-6518 testing method of the Korean Industrial Standard at an atmospheric temperature of 20° C.

EXAMPLE 4:

A molded impact-resistant polyurethane foam product was prepared as follows:

Reacting poly(propyleneoxide) having a hydroxyl value of 300, with 4,4'-methylene-bis(phenylisocyanate) at a temperature of 100° C. while adding dry inert gas, and thus, manufacturing a prepolymer containing residual isocyanate of 20% by weight.

Further, mixing poly(propyleneoxide) having a hydroxy value of 44, poly(glycerin/propyleneoxide) having a hydroxy value of 28, and poly(pentaerythritol/-propyleneoxide) having a hydroxy value of 90, based upon the equivalent ratio of 2:1:2 respectively; as additives, adding 4 pbw of a reaction accelerator in which a known tertiary amine is dispersed into 1,6-hexamethylene, 6 pbw of a reaction accelerator in which a known organic metal is rapidly agitated and dispersed into poly(propyleneoxide), and 2 pbw of polyethylene siloxane respectively, in proportion to 100 pbw of polyol; as plasticizers, adding 35 pbw of TCP in proportion to 100 pbw of polyol as aforementioned; at an increased temperature of up to 80° C., agitating and mixing the compound for 1.5 hours to manufacture a resin whose water content is in the range of 2.0±0.01 by weight.

Other processing is conducted in a same manner as in EXAMPLE 1. As a result, the physical property of molding's specimen is shown in Table 4.

TABLE 4

| (Physical properties of specimen having 10 mm in thickness) | | | | | |
|---|---|---|---|---|---|
| Equivalent ratio between isocyanate and hydroxy | 1.65 | 1.60 | 1.55 | 1.50 | 1.45 |
| Specific gravity of molding (g/cc) | 0.20 | 0.20 | 0.20 | 0.20 | 0.20 |
| Hardness (Shore C) | 40 | 38 | 33 | 30 | 25 |
| Rebound (%) | 5 | 5 | 5 | 5 | 5 |
| Tensile strength (kg/cm$^2$) | 9.8 | 8.9 | 8.6 | 8.3 | 7.9 |
| Elongation (%) | 250 | 250 | 250 | 250 | 240 |
| Tear strength (kg/cm) | 4.5 | 4.1 | 4.0 | 3.8 | 3.5 |
| Compression set (%) | | | About 2 | | |

Where: 1) Mold temperature is 60° C., 2) Cream time/rising time/tack free time/demolding time are 7 sec./85 sec./60 sec./7 min. respectively, 3) Free-blown specific gravity is 0.085 g/cc., 4) The testing conditions of physical property are based upon KSM-6518 testing method of the Korean Industrial Standard at a atmospheric temperature of 20° C.

EXAMPLE 5:

A molded impact-resistant polyurethane foam product was prepared as follows:

Reacting poly(propyleneoxide) having a hydroxy value of 400, with 4,4'-methylene-bis(phenylisocyanate) at the temperature of 100° C. while adding dry inert gas, and thus, manufacturing a prepolymer containing residual isocyanate of 10% by weight.

Further, mixing poly(propyleneoxide) having a hydroxy value of 32, poly(glycerin/propyleneoxide) having a hydroxy value of 37, and poly(ethylenediamine/-propyleneoxide) having a hydroxy value of 64, based upon the equivalent ratio of 3:1:3 respectively; as additives, adding 4 pbw of a reaction accelerator in which a known tertiary amine is dispersed into 1,6-hexamethylene, 10 pbw of a reaction accelerator in which a known organic metal is rapidly agitated and dispersed into poly(propyleneoxide), and 3 pbw of polyethylene siloxane respectively, in proportion to 100 pbw of polyol: as plasticizers, adding 15 pbw of D.O.P. in proportion to 100 pbw of polyol as aforementioned; at an increased temperature of up to 80° C., agitating and mixim the compound for 1.5 hours to manufacture a resin whose water content is in the range of 1.5±0.01 by weight.

Other processing is conducted in a same manner as in EXAMPLE 1. As a result, the physical property of molding's specimen is shown in Table 5.

TABLE 5

| (Physical properties of specimen having 10 mm in thickness) | | | | | |
|---|---|---|---|---|---|
| Equivalent ratio between isocyanate and hydroxy | 1.50 | 1.45 | 1.40 | 1.35 | 1.30 |
| Specific gravity of molding (g/cc) | 0.25 | 0.25 | 0.25 | 0.25 | 0.25 |
| Hardness (Shore C) | 48 | 46 | 44 | 42 | 40 |
| Rebound (%) | 6 | 6 | 6 | 6 | 7 |
| Tensile strength (kg/cm$^2$) | 11.2 | 11.0 | 10.4 | 10.2 | 9.6 |
| Elongation (%) | 250 | 250 | 250 | 250 | 250 |
| Tear strength (kg/cm) | 3.9 | 3.8 | 3.6 | 3.0 | 2.5 |
| Compression set (%) | | | About 2 | | |

Where: 1) Mold temperature is 60° C., 2) Cream time/rising time/tack free time/demolding time are 7 sec./95 sec./50 sec./7 min. respectively, 3) Free-blown specific gravity is 0.116 g/cc, 4) The testing conditions of physical property a based upon KSM-6518 testing method of the Korean Industrial Standard at an atmospheric temperature of 20° C.

COMPARISON OF EXAMPLES

TABLE 7

| (Physical properties of specimens having 10 mm in thickness) | | | | | |
|---|---|---|---|---|---|
| Kinds of Item | A | B | C | D | E |
| Specific gravity of molding (g/cc) | 0.315 | 1.1 | 0.29 | 1.33 | 0.35 |
| Hardness (Shore C) | 53 | 39 | 33 | 33 | 35 |
| Rebound (%) | 15 | 15 | 15 | ·12 | 8 |
| Tensile strength (kg/cm$^2$) | 40.2 | 5.5 | 11.0 | 7.1 | 8.0 |
| Elongation (%) | 200 | 260 | 200 | 530 | 220 |
| Tear strength (kg/cm) | 14.7 | 2.0 | 4.1 | 2.3 | 3 |
| Compression set (%) | 39.0 | 1.5 | 15.0 | 1.5 | 3.8 |

What is claimed is:

1. An impact-resistant polyurethane foam product having an elasticity of less than 10 percent and a compression set of less than 5 percent, and made by the process of:
   (a) providing a diisocyanate monomer or prepolymer containing from 5 to 25 percent residual isocyanate by weight, by reacting a diisocyanate and a propyleneoxide-based polydiol having a hydroxy value of from 30 to 500 mg KOH/g;
   (b) providing a resin composed of:
      (i) a propyleneoxide-based polyol having two hydroxyl functional groups at a chain end and a hydroxyl value of from 25 to 100 mg KOH/g,
      (ii) a propyleneoxide-based polyol having three hydroxyl functional groups at a chain end and a hydroxyl value of from 20 to 1000 mg KOH/g,
      (iii) a propyleneoxide-based polyol having four hydroxyl functional groups at a chain end and a hydroxyl value of from 50 to 220 mg KOH/g, (iv) an organic metallic reaction accelerator produced by agitating together at least one diamine with at least one organic metallic compound,
(v) a plasticizer, and
(vi) a polyalkyl- or polyalkoxysiloxane;
(c) preheating said diisocyanate monomer or prepolymer and said propylene oxide-based polyol to about 40° to 60° C., rapid agitating, and forming a foamed product thereof by casting;
said product having a moisture content in the range from 0.3 percent to 3.0 percent by weight.

2. The polyurethane foam product of claim 1, wherein:
said organic metallic reaction accelerator is produced by agitating together at least one diamine selected from the group consisting of tetramethylethylenediamine, tetramethylhexadiamine, tetraethylmethylenediamine, diethylpiperazine and triethylenediamine, and at least one organometallic compound selected from the group consisting of stannous octoate, dibutylenediacetate, sodium bicarbonate, lead octate and potassium acetate.

3. The polyurethane foam product of claim 1, wherein:
said plasticizer is selected from the group consisting of dimethylphthalate, diethylphthalate, diisobutylphthalate, dibuthylphthalate, dioctylphthalate, dinonylphthalate, diisooctylphthalate, diisodecylphthalate, dipropyleneglycolbenzoate, tricresylphosphate, octyldiphenylphosphate and cresyldiphenylphosphate.

4. The polyurethane foam product of claim 1, wherein:
said polyalkyl- or polyalkylenesiloxane is selected from the group consisting of polymethylsiloxane, polyethylsiloxane, polymethylenesiloxane and polyethylenesiloxane.

* * * * *